T. G. SELLECK.
FURNACE.
APPLICATION FILED MAY 14, 1915.

1,172,398.

Patented Feb. 22, 1916.
3 SHEETS—SHEET 1.

Witness
Einar Larson

Inventor
Theodore G. Selleck
By Milo B. Stevens
Attorneys

Theodore G. Selleck

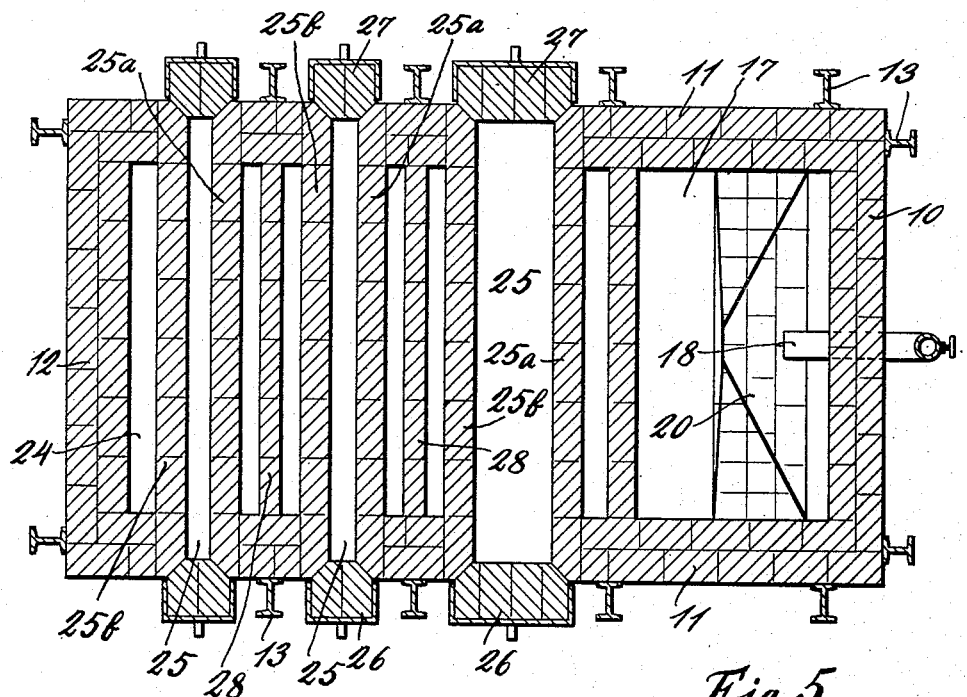
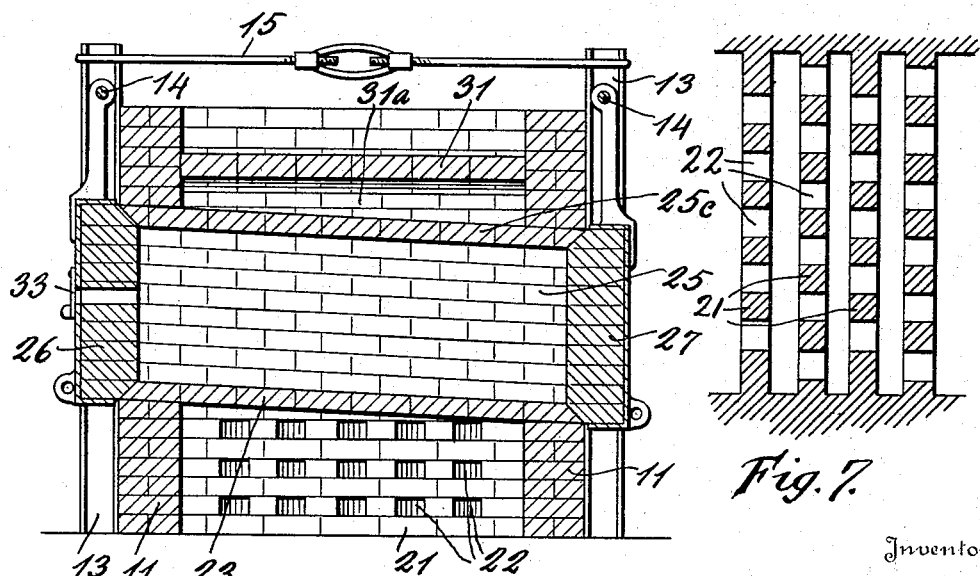

UNITED STATES PATENT OFFICE.

THEODORE G. SELLECK, OF MILWAUKEE, WISCONSIN.

FURNACE.

1,172,398.

Specification of Letters Patent.

Patented Feb. 22, 1916.

Application filed May 14, 1915. Serial No. 28,150.

*To all whom it may concern:*

Be it known that I, THEODORE G. SELLECK, a citizen of the United States, residing at Milwaukee, in the county of Milwaukee and State of Wisconsin, have invented certain new and useful Improvements in Furnaces, of which the following is a specification.

This invention relates to furnaces employed for converting, case-hardening and other processes requiring a high and substantially uniform degree of heat, and it is in the nature of an improvement upon the furnaces shown in my Patents, Nos. 729681 and 770025, dated June 2, 1903 and September 13, 1904, respectively.

The object of the present invention is to provide a novel and improved furnace structure embodying an arrangement of flues whereby the flames are distributed entirely around the chambers containing the material to be treated, so that large heating surfaces are obtained, resulting in a superior product.

Figure 1:
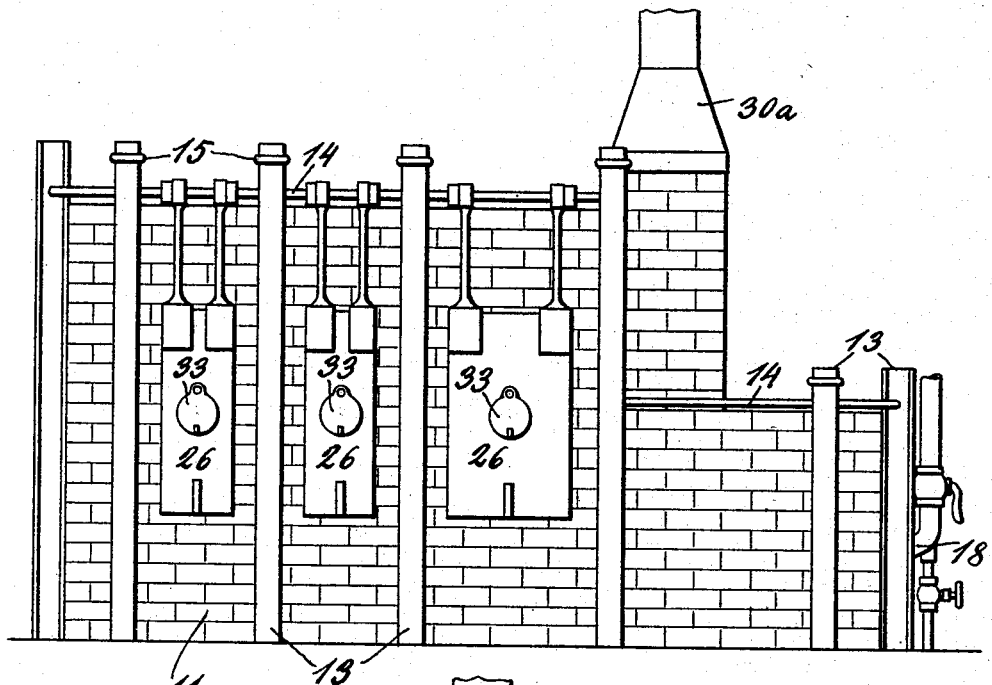
Figure 2:
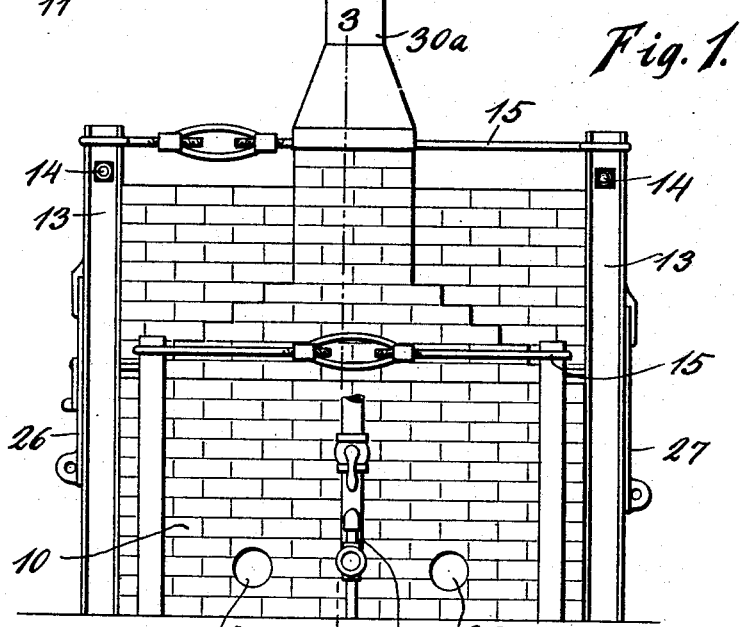
Figure 3:
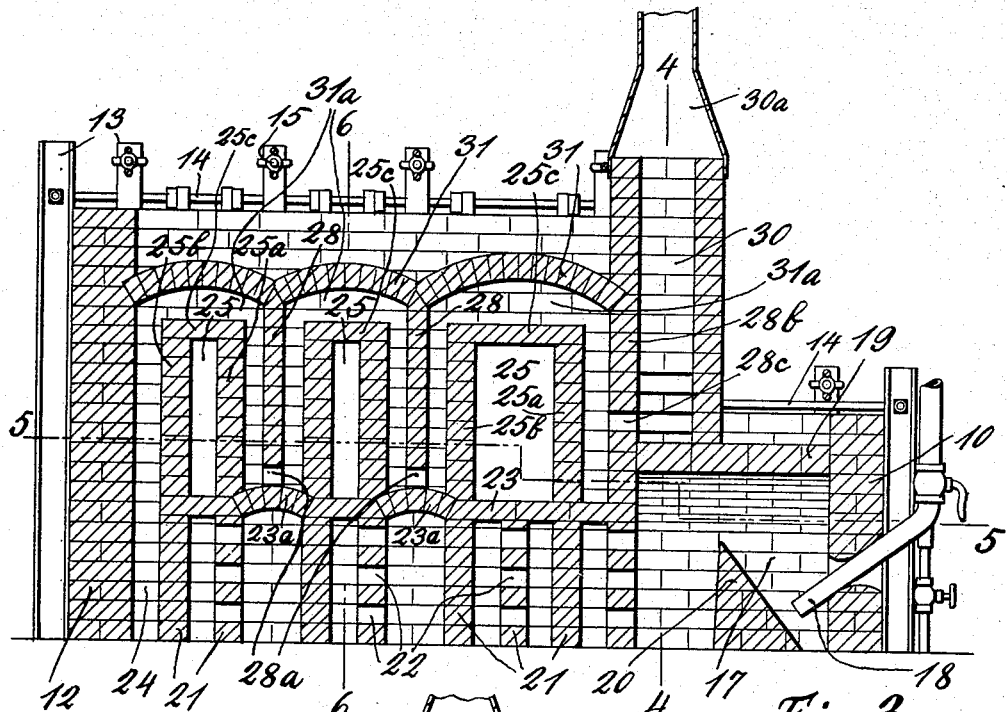
Figure 4:
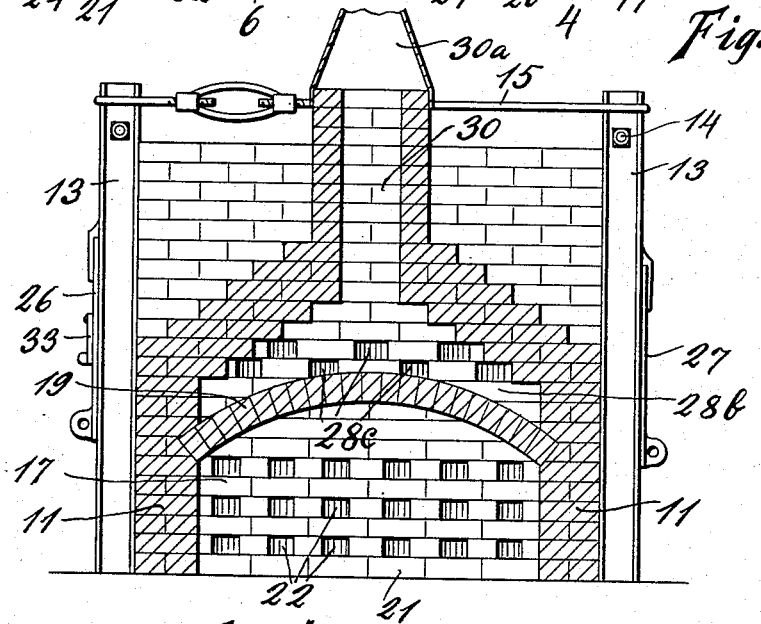

In the accompanying drawing Figure 1 is a side elevation of a furnace constructed in accordance with the present invention; Fig. 2 is a front elevation of the furnace; Fig. 3 is a longitudinal section on the line 3—3 of Fig. 2; Fig. 4 is a cross-section on the line 4—4 of Fig. 3; Fig. 5 is a horizontal section on the line 5—5 of Fig. 3; Fig. 6 is a cross-section on the line 6—6 of Fig. 3, and Fig. 7 is a horizontal section of a fragment of the bottom flue of the furnace.

Referring specifically to the drawings, the furnace is built of fire brick, having a front wall 10, side walls 11 and a rear wall 12. The structure is braced by a series of posts 13 of I section connected longitudinally by rods 14, and transversely by rods 15, the latter extending across the top of the furnace. These rods are provided with turnbuckles for tightening the same. The entire furnace is set in a bed or foundation of concrete.

At the front end of the furnace is a combustion chamber 17 which is fired by an oil burner, the nozzle 18 of which enters the combustion chamber through an opening in the wall 10. The combustion chamber has an arched roof 19, and from the floor, a short distance to the rear of the front wall 10, rises a deflecting wall 20, the side of said wall which faces the burner being sloping and the nozzle 18 being arranged perpendicularly with respect to said sloping face to discharge the flame squarely thereon, whereby the flame is broken up and deflected upward and rearward in the form of a sheet.

Behind the wall 20, the furnace contains a series of transverse walls or partitions 21 which are spaced and have openings 22. The openings 22 of adjacent walls are not in alinement but are staggered so that a tortuous flue is produced. This flue has a top wall 23 provided with arches 23$^a$.

At the back of the furnace is a vertical flue 24 into which the tortuous flue hereinbefore described opens by the openings 22 in the rearmost wall or partition 21.

The wall 23 forms the floor of a series of transverse chambers 25 in which the charges are placed. The ends of these chambers are open and provided with swinging closures 26 and 27, respectively. The chambers have a slight transverse incline to allow the charge to be pushed in more easily from the higher end, and pushed out of the lower end by means of a bar inserted from the higher end. The front and rear walls of the chambers are shown at 25$^a$ and 25$^b$, respectively, and the top at 25$^c$, and the wall 23 forms the bottom or floor of the chambers. The side walls 11 of the furnace form the end walls of the chambers.

The chambers 25 are spaced, to obtain flues therebetween, and in said flues are partitions 28 having bottom openings 28$^a$. The flue 24 extends upward behind the rearmost chamber, and in front of the forward chamber is a partition 28$^b$. In front of the partition 28$^b$ is an exit flue 30 leading to a stack 30$^a$, and said partition has bottom openings 28$^c$. Above each chamber and spaced therefrom are arches 31, whereby top flues 31$^a$ are had. The partitions 28 extend between the side walls 11 of the furnace and rise from the walls 23 to the arches 31. The flue 24 communicates at its upper end with the flue 31$^a$ above the rearmost chamber 25, and said flue 31$^a$ communicates with the flue space behind the partition 28 which is located between the rearmost chamber and the next chamber ahead. The space on the other side of the last-mentioned partition communicates with the flue 31$^a$ above the last-mentioned chamber, and said last-mentioned flue 31$^a$ communicates with the space between the last-mentioned chamber and the partition 28 in front thereof. The space on the other side of the last-mentioned partition communicates with the flue 31$^a$ above the forward chamber 25, and said last-mentioned flue 31ª communicates with the space between the last-mentioned chamber and the partitions 28ᵇ having the openings 28ᶜ into the exit flue 30 leading to the stack 30ª.

It will be evident from the foregoing that the heat and flames pass rearward beneath the chambers 25, then rise in the flue 24 and pass across the top of the chambers and also up and down the front and rear walls thereof, and finally escape to the exit flue 30. The charge chambers therefore have a large heating surface they being entirely surrounded with a mass of live flame, resulting in a superior product.

Air ports 32 are provided in the front wall 10 of the furnace, and the doors 26 have wickets 33 for the insertion of a pyrometer or a test bar.

I claim:—

1. A furnace comprising a combustion chamber, a series of spaced transverse treating chambers to the rear of the combustion chamber, an upward extending flue at the rear end of the furnace, a longitudinal bottom flue beneath the treating chambers leading from the combustion chamber to the aforesaid rear flue, said bottom flue being composed of spaced transverse partitions having openings, and the openings of consecutive partitions being staggered, a top flue above each treating chamber, the top flue of the rear treating chamber leading from the top of the rear flue, perforated partitions in the spaces between the treating chambers, the spaces on opposite sides of the partitions communicating respectively with the top flues of adjacent treating chambers, a perforated partition in front of and spaced from the front treating chamber, the space between said last-mentioned partition and treating chamber being in communication with the top flue of said chamber, and an exit flue into which the perforations of the last-mentioned partition open.

2. A furnace comprising a combustion chamber, a series of spaced transverse treating chambers to the rear of the combustion chamber, an upward extending flue at the rear end of the furnace, a longitudinal bottom flue beneath the treating chambers leading from the combustion chamber to the aforesaid rear flue, said bottom flue being composed of spaced transverse partitions having openings, and the openings of consecutive partitions being staggered, an exit flue at the front end of the furnace and flues above the treating chambers in communication with the spaces between said chambers and communicating at one end with the rear flue and at the other end with the exit flue.

In testimony whereof I affix my signature in presence of two witnesses.

THEODORE G. SELLECK.

Witnesses:
ALBERT E. ROBERTS,
H. L. GRIEB.

Copies of this patent may be obtained for five cents each, by addressing the "Commissioner of Patents, Washington, D. C."